United States Patent [19]

Sawamura

[11] 4,222,295
[45] Sep. 16, 1980

[54] LUBRICATING APPARATUS FOR HORIZONTAL BANDSAW MACHINES

[75] Inventor: Mitsuyoshi Sawamura, Kobe, Japan

[73] Assignee: Amada Company, Limited, Isehara, Japan

[21] Appl. No.: 947,047

[22] Filed: Sep. 29, 1978

[30] Foreign Application Priority Data

Sep. 29, 1977 [JP] Japan .................................. 52-129860

[51] Int. Cl.³ .............................................. B23D 59/04
[52] U.S. Cl. .......................................... 83/169; 83/794
[58] Field of Search .......................... 83/169, 168, 794

[56] References Cited

U.S. PATENT DOCUMENTS

| 1,390,469 | 9/1921 | Stowell | 83/169 |
|---|---|---|---|
| 1,421,107 | 6/1922 | Stowell | 83/169 |
| 1,434,235 | 10/1922 | Stowell | 83/169 |
| 1,502,120 | 7/1924 | Rasmussen | 83/169 |
| 1,596,033 | 8/1926 | Thompson et al. | 83/801 |
| 3,097,675 | 7/1963 | Benedict | 83/169 |
| 3,104,576 | 9/1963 | Robinson | 83/169 |
| 3,848,493 | 11/1974 | Harris | 83/169 X |

Primary Examiner—Frank T. Yost
Attorney, Agent, or Firm—Wigman & Cohen

[57] ABSTRACT

The present invention relates to a horizontal bandsaw machine comprising a bandsaw blade for cutting a workpiece in a cutting zone of the horizontal bandsaw machine, a saw-guide for guiding the bandsaw, a lubricating member located above a back edge of the bandsaw blade, and an elongate plate for contacting the workpiece, and at least aperture for applying lubricant to the back edge of the bandsaw blade. The saw-guide is located at opposite sides of the cutting zone and the elongate plate is located at a side of the bandsaw blade. The aperture for applying lubricant to the back edge of the bandsaw blade is provided at an underside of the lubricating member so as to be aligned in a line in a direction along a length of the bandsaw blade.

12 Claims, 6 Drawing Figures

LUBRICATING APPARATUS FOR HORIZONTAL BANDSAW MACHINES

BACKGROUND OF THE INVENTION

1. Field of the Invention

The present invention relates generally to so-called horizontal bandsaw machines and, more particularly, to a lubricating apparatus for applying cutting lubricant to an endless bandsaw blade in horizontal bandsaw machines.

2. Description of the Prior Art

In horizontal bandsaw machines, an endless bandsaw blade is trained around a pair of bandsaw wheels which are mounted on a saw head assembly for rotation to drive the bandsaw blade for cutting operations. The bandsaw blade is slidably guided by a pair of saw-guide assemblies which are provided at opposite sides of the cutting zone of the machine so that its cutting edge, when passing through the cutting zone, may be kept perpendicular to a work-table on which workpieces to be cut are placed. Also, the saw head assembly carrying the bandsaw wheels is so mounted as to be lowered towards the work-table so that the bandsaw blade may cut the workpieces placed on the work-table.

Since high-speed cutting is an important duty of the horizontal bandsaw machines, it is necessary that the bandsaw blade be lubricated with cutting lubricant at the cutting zone of the machine to minimize its friction with the workpieces being cut. Unless the bandsaw blade is lubricated, it will be worn out early because of the friction and the heat caused thereby during cutting operations. When the bandsaw blade becomes worn, of course, the cutting rate and accuracy will be greatly reduced, and furthermore the workpieces being cut will be subject to undesirable work hardening.

Conventionally, in order to lubricate the bandsaw blade in the horizontal bandsaw machines, the saw-guide assemblies for guiding the bandsaw blade at the opposite sides of the cutting zone are so designed as to apply the cutting lubricant to the bandsaw blade. Thus, the bandsaw blade is lubricated just before cutting into the workpieces being cut in order to minimize its friction, and it is also flooded with lubricant after having cut through the workpieces mainly for the purpose of washing off cutting chips. In this manner, the bandsaw blade is lubricated with less problems by the saw-guide assembly which guides the bandsaw blade just before cutting into the workpieces, for as long a time as the bandsaw blade is cutting workpieces which are small in size and are not difficult to cut.

In the conventional manner, however, the bandsaw blade cannot be lubricated sufficiently enough to cut large workpieces which are too large in cross section to be cut by the bandsaw blade. Difficulties with regard to the conventional manner are due to the fact that the bandsaw blade is lubricated only by the saw-guide assembly which guides the bandsaw blade before it cuts into the workpieces. Needless to say, the larger the workpieces to be cut, the more the bandsaw blade has to cut through the workpieces, and the larger amount of cutting lubricant is necessary to cut large workpieces. In this regard, the bandsaw blade cannot be sufficiently lubricated in the conventional manner, since the cutting lubricant is supplied to minimize the friction of the bandsaw blade mainly only by one of the saw-guide assemblies, namely, that assembly utilized for guiding the bandsaw blade before cutting into the workpieces. Also, the cutting lubricant which is applied by the saw-guide assembly to the bandsaw blade will be lost when the bandsaw blade is cutting the initial portion of the large workpieces and the cutting lubricant cannot be maintained thereafter on the bandsaw blade in order to continue to minimize the friction caused by the bandsaw blade.

In order to overcome the above described disadvantages, some horizontal bandsaw machines are provided with a midway lubricating means for applying the cutting lubricant to the bandsaw blade between the two saw-guide assemblies. In this case, however, a problem is that such a midway lubricating means should be so disposed that it will never be brought into collision with workpieces placed on the work-table, since the workpieces will come in between the two saw-guide assemblies as the saw head assembly is lowered to cut the workpieces. Therefore, there have been some horizontal bandsaw machines in which the midway lubricating means is fixedly mounted at a position duly apart from the run-way of the bandsaw blade so that it will never be touched by the largest workpieces that can be cut by the machine. As another problem, however, it is desirable that the midway lubricating means be arranged as near as possible to the workpieces being cut so as to effectively apply the cutting lubricant to the bandsaw blade. Also, it is necessary that the midway lubricating means be so provided that it may apply the cutting lubricant to the top of the back edge of the bandsaw blade so as to lubricate both sides of the bandsaw equally. For these reasons, in some horizontal bandsaw machines, a midway lubricating means using, for example, a flexible tube is adjustably provided in a manner such that the midway lubricating means can be adjusted with regard to its position depending upon sizes of workpieces to be cut. In this case, however, of course it is very troublesome to adjust the position of the midway lubricating means each time when it is desired to cut different sizes of workpieces. Furthermore, the midway lubricating means, even if properly set at the beginning, will get out of position because of vibrations during cutting operations and will cease to properly apply the cutting lubricant to the bandsaw blade.

SUMMARY OF THE INVENTION

It is the general object of the present invention to provide an improved lubricating apparatus for horizontal bandsaw machines.

It is a specific object of the present invention to provide a lubricating apparatus for effectively lubricating the endless bandsaw blade between the saw-guide means in the horizontal bandsaw machines.

It is another specific object of the present invention to provide a lubricating apparatus for the horizontal bandsaw machines which can be used to effectively lubricate the bandsaw blade without adjusting its position in dependence upon sizes of workpieces to be cut.

It is another object of the present invention to provide a lubricating apparatus which is very simple in construction but effectively applies the cutting lubricant to the bandsaw blade of a horizontal bandsaw machine.

Basically, these objects are accomplished by providing a horizontal bandsaw machine with a lubricating means which is slidably mounted on the saw head assembly so that it may be moved between the saw-guide means while it is kept in contact with the workpieces being cut as the saw head assembly is lowered.

Other and further objects and advantages of the present invention will be apparent from the following description and accompanying drawings which, by way of illustration, show embodiments of the present invention and the principle thereof.

DESCRIPTION OF THE PREFERRED EMBODIMENTS

Figure 1:
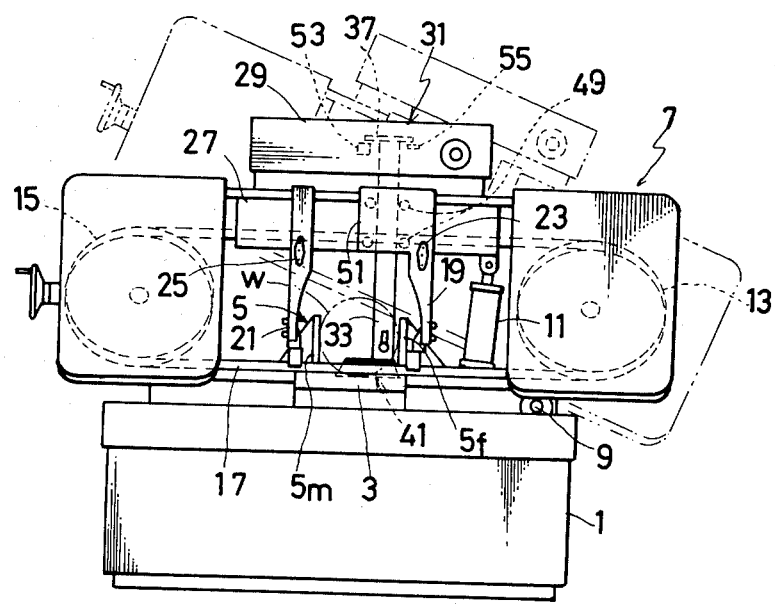
FIG. 1 is a front view of a horizontal bandsaw machine in which the lubricating apparatus according to the present invention is embodied.

Referring to FIG. 1, a horizontal bandsaw machine comprises a base 1 which has at its top a work-table 3 on which a vise assembly 5 having a fixed jaw 5f and a movable jaw 5m is mounted to hold a workpiece W to be cut. A saw head assembly 7 is connected to the base 3 by means of a hinge pin 9 so that it may be raised and lowered by a hydraulic motor 11 of a cylinder type which is pivotally mounted on the base 1. As is well known, the saw head assembly 7 is raised when the hydraulic motor 11 is supplied with hydraulic fluid, and it is lowered when the hydraulic fluid is exhausted from the hydraulic motor 11. Also, the saw head assembly 7 includes a driving wheel 13 and a driven wheel 15 between which an endless bandsaw blade 17 is trained so that it may be rotated therearound when the driving wheel 13 is power driven. The bandsaw blade 17 is slidably guided by a pair of saw-guide assemblies 19 and 21 so that its cutting edge may be kept perpendicular to the work-table 3 therebetween to define the cutting zone. The saw-guide assemblies 19 and 21 are releasably fixed by knobs 23 and 25, respectively, to a guide bar 27 fixed to the saw head assembly 7 in such a manner as to depend therefrom. Also, a control box 29 enclosing various controlling means is fixed to the top of the saw head assembly 7. Thus, when the cutting head assembly 7 is swung down to the work-table 3 around the hinge pin 9 with the bandsaw blade 17 rotated therein, the workpiece W held by the vise assembly 5 on the work-table 3 is cut by the bandsaw blade 17. In this connection, however, it will be understood that the present invention is applicable to any known type of horizontal bandsaw machine such, for example, as that in which a saw head assembly 7 is vertically raised and lowered in its entirety along a single or plural vertical guide means.

Stated more particularly with regard to the above, the saw-guide assembly 21 is moved along the guide bar 27 by loosing the knob 25 to adjust the span between the saw-guide assemblies 19 and 21 depending upon sizes of workpieces W to be cut, while the saw-guide assembly 19 is usually fixed. Also, the saw-guide assemblies 19 and 21 are conventionally so designed as to apply cutting lubricant to the bandsaw blade 17 passing therethrough. Since the driving wheel 13 is so rotated as to run the bandsaw blade 17 from the saw-guide assembly 21 to the saw-guide assembly 19 in most cases, the bandsaw blade 17 is lubricated by the saw-guide assembly 21 mainly for the purpose of minimizing friction, while it is lubricated by the saw-guide assembly 19 mainly for the purpose of washing off cutting chips.

Figure 2:
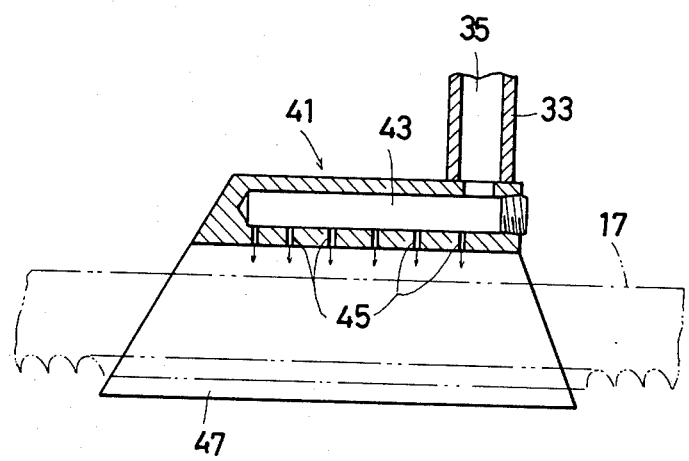
FIG. 2 is a sectional view showing a portion of the lubricating apparatus according to the present invention in which the lubricating apparatus is mounted on the horizontal bandsaw machine shown in FIG. 1.

According to the present invention, a midway lubricating means, generally designated by the numeral 31 in the drawings, is so provided as to slidably depend from the control box 29 between the saw-guide assemblies 19 and 21 in order to lubricate the bandsaw blade 17 therebetween. The midway lubricating means 31 comprises an elongate tubular member 33 which has at its interior an elongate hollow portion 35 into which the cutting lubricant is supplied. This tubular member 33 is slidably disposed between the saw-guide assemblies 19 and 21 and is parallel therewith. The tubular member 33 is also provided at its top end with a cross bar member 37 fixed at right angles thereto for the purpose to be described hereinafter. The tubular member 33 also may be provided at its lower portion with a tap member 39 for blocking the cutting lubricant whenever it is needed to do so. The tubular member 33 is further provided at its lowermost end with an elongate lubricating member 41 which is fixed at right angles thereto and is formed at its interior with an elongate hollow portion 43 connected with the hollow portion 35 of the tubular member 33. This arrangement is best shown in FIG. 2. The lubricating member 41 is further formed at its underside with a plurality of holes 45 which are so formed as to open in a line from the hollow portion 43 so as to apply the cutting lubricant to the straight back edge of the bandsaw blade 17. Furthermore, the lubricating member 41 is provided at its lower side end with an elongate plate 47 which is so fixed thereto as to depend downwardly along the length thereof on the back side of the bandsaw blade 17. Thus, it will be understood that the elongate plate 47 will be initially brought into contact with the workpiece W when the saw head assembly 7 is lowered in order to enable the bandsaw blade 17 to cut into the workpiece W. Also, it will be understood from the above description that the bandsaw blade 17 is lubricated with the cutting lubricant from the holes 45 of the lubricating member 41, as shown by arrows in the drawings, when the cutting lubricant is supplied through the hollow portion 35 of the tubular member 33.

The lubricating means 31 is so designed as to freely move towards and away from the bandsaw blade 17 at right angles thereto in a manner such that the holes 45 of the lubricating member 41 will be always on the cutting plane where the bandsaw blade 17 is run. For this purpose, the tubular member 33 of the lubricating means 31 is so arranged as to slide along and between two pairs of guide rollers 49 which are freely rotatably provided on a plate member 51. This plate member 51 is provided at the upper portion of the saw-guide assembly 19 in the preferred embodiment shown in FIG. 1. Also, the control box 29 is formed with openings so as to enable the upper portion of the tubular member 33 to freely move therethrough. Furthermore, the tubular member 33 is stopped from rotating by a suitable means so that the holes 45 of the lubricating member 41 are kept on the cutting plane. Thus, the cutting lubricant is always directed to the back edge of the bandsaw blade 17 from the holes 45 of the lubricating member 41 when the cutting lubricant is supplied into the tubular member 33. Also, it will be understood that the lubricating means 31 will not be lowered after the elongate plate 47 has been brought into contact with the workpiece W even when the saw head assembly 7 continues to be lowered.

Figure 3:
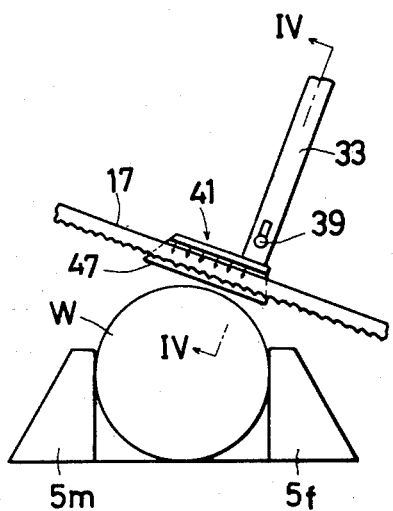
FIG. 3 is a partial front view of the horizontal bandsaw machine shown in FIG. 1 in which the lubricating apparatus according to the present invention is also shown.

As shown in FIG. 1, a stop member 53 is provided within the control box 29 in such a position so that it may be touched by the cross bar member 37 of the lubricating means 31 in order to define the lowermost limit of the lubricating means 31 with regard to the bandsaw blade 17 when the saw head assembly 7 is raised. The stop member 53 and the cross bar member 37 are so arranged as to keep the lubricating member 41 of the lubricating means 31 slightly apart from the back edge of the bandsaw blade 17, as shown in FIG. 3, when the lubricating means 31 is at its lowermost limit. In this connection, it will be understood that the lubricating means 31 will be always at its lowermost limit unless the elongate plate 47 is in contact with the workpiece W to whether or not the saw head assembly 7 is raised. Thus, it will be apparent that the lubricating means 31 will be raised with its lubricating member 47 kept slightly apart from the back edge of the bandsaw blade 17 when the saw head assembly 7 is raised.

Figure 4:
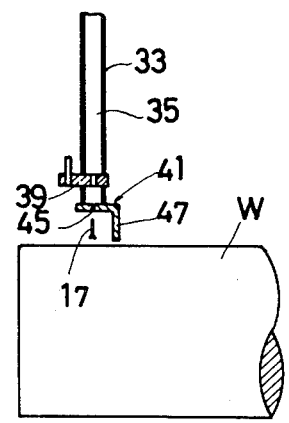
FIG. 4 is a partial side view shown in a cross section taken along the line IV—IV of FIG. 3.
Figure 5:
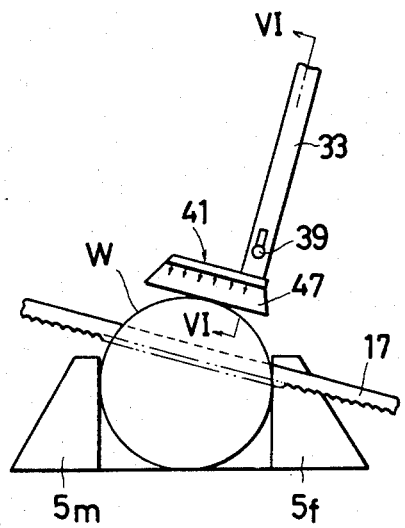
FIG. 5 is a partial front view which is similar to FIG. 3 but shows the bandsaw blade as cutting the workpiece.
Figure 6:
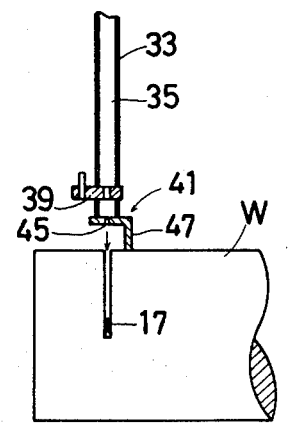
FIG. 6 is a partial side view shown in a cross section taken along the line VI—VI of FIG. 5.

As is now understood from the above description, in cutting operations, the lubricating means 31 is lowered to the workpiece W together with the bandsaw blade 17, as shown in FIGS. 3 and 4 to lubricate the bandsaw blade 17 until the elongate plate 47 is brought into contact with the workpiece W. After the elongate plate 47 has been brought into contact with the workpiece W, the lubricating means 31 remains on the workpiece W to lubricate the bandsaw blade 17 and only the bandsaw blade 17 continues to be lowered in order to cut into the workpiece W, as shown in FIGS. 5 and 6. It will be understood that the lubricating means 31 remaining on the workpiece W will effectively apply the lubricant to the back edge of the bandsaw blade 17 even after the bandsaw blade 17 has cut into the workpiece W, since the holes 45 of the lubricating means 31 are always on the cutting plane of the bandsaw blade 17.

In the above discussion, the lubricating means 31 has been described as serving only to apply the cutting lubricant to the bandsaw blade 17. However, the lubricating means 31 can be made to double as a regulating means for regulating the up-and-down motion of the saw head assembly 7.

In order to use the lubricating means 31 to regulate the motion of the saw head assembly 7, the stop member 53 not only is so designed as to stop the lubricating means 31 from lowering but also is constructed as a valve means to regulate the hydraulic fluid exhausted from the hydraulic motor 11. Also, a limit switch 55 is provided within the control box 29 so that it may be actuated by the cross bar member 37 of the lubricating means 31 at the same time when the stop member 53 is touched by the cross bar member 37. The stop member 53, doubling as the valve means, is so arranged that it will allow the saw head assembly 7 to lower rapidly when touched by the cross bar member 37 and it will slow down the saw head assembly 7 when it is not touched by the cross bar member 37. On the other hand, the limit switch 55 is so arranged as to stop the saw head assembly 7 from being raised at a time after it has been actuated by the cross bar member 37. Thus, the saw head assembly 7 is stopped from being raised as soon as the stop member 53 raises the cross bar member 37 of the lubricating means 31 in order to bring the elongate plate 47 away from the workpiece W, since the limit switch 55 is actuated simultaneously when the stop member 53 touches the cross bar member 37. Accordingly, the bandsaw blade 17 is automatically stopped without needlessly being raised after it has performed only one cycle of cutting. Thus, the bandsaw blade 17 may quickly begin another cycle of cutting on the workpiece W. Also, the saw head assembly 7 will be lowered rapidly until the elongate plate 47 of the lubricating means 31 is brought into contact with the workpiece W but the saw head assembly 7 will be slowed down thereafter in order to enable the bandsaw blade 17 to cut into the workpiece W at a moderate speed.

As it has been so far described, the lubricating apparatus according to the present invention has overcome the difficulties in lubricating the bandsaw blade in the horizontal bandsaw machines of the prior art. To summarize, this is accomplished in the following manner. First, the bandsaw blade 17 is lubricated sufficiently enough to minimize its friction even when cutting large workpieces, since the cutting lubricant is supplied between the saw-guide assemblies 19 and 21 by the lubricating means 31 in addition to the cutting lubricant supplied by the saw-guide assembly 21. The cutting lubricant is applied to the bandsaw blade 17 from the nearest position possible through the plurality of holes 45 in the lubricating means 31 after the lubricating means 31 is brought and placed onto the workpieces W to be cut. Also, the lubricating means 31 is so designed as to be brought and placed onto the workpieces W automatically by the saw head assembly 7 so that the cutting lubricant may be always directed to the back edge of the bandsaw blade 17, whether the workpieces W to be cut are large or small. Accordingly, it is unnecessary to adjust the position of the lubricating means 31 between the saw-guide assemblies 19 and 21 in dependence upon the sizes of the workpieces W to be cut each time that it is desired to cut different sizes of workpieces W. Furthermore, the lubricating means 31 can be so designed that it will not only apply the cutting lubricant to the bandsaw blade 17 but also will control the up-and-down movement of the saw head assembly 7. Thus, the lubricating apparatus, according to the present invention, can be advantageously used to effectively both lubricate and control the bandsaw blade 17 in the horizontal bandsaw machines.

Although a preferred form of the present invention has been illustrated and described, it should be understood that the device is capable of modification by one skilled in the art without departing from the principles of the invention. Accordingly, the scope of the invention is to be limited only by the claims appended hereto.

I claim:

1. A lubricating apparatus for horizontal bandsaw machines which is characterized by: an elongate member having a hollow portion is slidably provided for up and down movement between saw-guide means for guiding a bandsaw blade, said elongate member being provided integrally at its lowermost end with a lubricating member located above a back edge of the bandsaw and also being provided with an elongate plate located at a side of the bandsaw blade, and a plurality of aperture means connected with said hollow portion and provided at an underside of the lubricating member so as to be aligned in a line in a direction along a length of the bandsaw blade.

2. A horizontal bandsaw machine comprising:
a bandsaw blade means for cutting a workpiece in a cutting zone of the horizontal bandsaw machine;
saw-guide means for guiding the bandsaw blade means, said saw-guide means being located at opposite ends of the cutting zone;
a lubricating member located above a back edge of the bandsaw blade means in said cutting zone, said lubricating member being slidably mounted for reciprocating movement along a path of travel toward and away from the bandsaw blade means;
at least one aperture means in said lubricating member for applying lubricant to the back edge of the bandsaw blade means, said aperture means being aligned in a direction along the cutting zone of the bandsaw blade means; and
means operatively connected to the lubricating member for contacting the workpiece and moving the lubricating member relative to the bandsaw blade means along said path of travel.

3. A horizontal bandsaw machine, according to claim 2, further comprising means for feeding lubricant to the lubricating member.

4. A horizontal bandsaw machine, according to claim 3, wherein the feeding means is a tubular member.

5. A horizontal bandsaw machine, according to claim 4, wherein the tubular member is integrally connected at its lowermost end with the topside of the lubricating member.

6. A horizontal bandsaw machine according to claim 5, wherein said lubricating member has an elongate hollow interior in communication with the tubular member and the aperture means.

7. A horizontal bandsaw machine according to claim 4, including means in said tubular member for blocking the feed of lubricant to the lubricating means.

8. A horizontal bandsaw machine according to claim 2, wherein said path of travel is at right angles to the bandsaw blade means and parallel to the plane of the cutting zone.

9. A horizontal bandsaw machine according to claim 2, including stop means arranged on the machine for limiting the movement of the lubricating member toward the bandsaw blade means.

10. A horizontal bandsaw machine according to claim 2, wherein said workpiece contacting means comprises an elongate plate connected to the lubricating member laterally adjacent the aperture means and substantially parallel to the bandsaw blade means.

11. A horizontal bandsaw machine according to claim 2, wherein said aperture means comprises a plurality of holes arranged in the underside of the lubricating member substantially parallel to the bandsaw blade means such that the lubricant is applied to the back edge of the bandsaw blade means in the cutting zone.

12. A horizontal bandsaw machine according to claim 2, including rollers mounted on said bandsaw machine for slidably mounting the lubricating member for reciprocal movement.

* * * * *